(12) United States Patent
Choi

(10) Patent No.: US 7,070,371 B2
(45) Date of Patent: Jul. 4, 2006

(54) CHAMFERING AIR TOOL

(76) Inventor: Cheol-Hwan Choi, Guje Dongwon Apt. 103-1303, #1033-2 Guje-dong, Yeonje-gu, Pusan (KR)

( * ) Notice: Subject to any disclaimer, the term of this patent is extended or adjusted under 35 U.S.C. 154(b) by 35 days.

(21) Appl. No.: 11/007,783

(22) Filed: Dec. 8, 2004

(65) Prior Publication Data
US 2006/0120818 A1 Jun. 8, 2006

(51) Int. Cl.
B23C 1/20 (2006.01)

(52) U.S. Cl. .................. 409/180; 409/138; 409/137; 409/136; 409/135; 409/134; 409/215; 408/59; 144/136.95; 144/252.1

(58) Field of Classification Search ............... 409/180, 409/138, 137, 181–182, 175, 134, 215, 135–136; 144/154.5, 136.95, 252.1, 145.3, 253.3; 408/57, 408/59
See application file for complete search history.

(56) References Cited

U.S. PATENT DOCUMENTS

| 3,332,462 | A | * | 7/1967 | Williams | 144/136.95 |
| 3,360,023 | A | * | 12/1967 | Rutzebeck | 144/134.1 |
| 3,494,395 | A | * | 2/1970 | Graham | 144/136.95 |
| 3,877,500 | A | * | 4/1975 | Ulmer | 409/134 |
| 4,135,334 | A | * | 1/1979 | Rudiger | 451/456 |
| 4,669,923 | A | * | 6/1987 | McKinney | 144/154.5 |
| 4,946,323 | A | * | 8/1990 | Kazama et al. | 409/180 |
| 4,964,765 | A | * | 10/1990 | Kishi | 409/181 |
| 5,004,385 | A | * | 4/1991 | Kishi | 409/180 |
| 5,018,914 | A | * | 5/1991 | Kishi | 409/180 |
| 5,522,684 | A | * | 6/1996 | Heck | 409/138 |
| 5,762,454 | A | * | 6/1998 | Yamada | 409/134 |
| 5,848,930 | A | * | 12/1998 | Jones | 409/138 |
| 6,050,759 | A | * | 4/2000 | Bone | 409/182 |
| 6,409,641 | B1 | * | 6/2002 | Hashimoto | 409/137 |
| 6,733,216 | B1 | * | 5/2004 | Bohringer | 409/138 |
| 2002/0182023 | A1 | * | 12/2002 | Lai et al. | 409/137 |
| 2003/0165367 | A1 | * | 9/2003 | Bohringer | 409/138 |

* cited by examiner

Primary Examiner—Erica Cadugan
(74) Attorney, Agent, or Firm—Jordan and Hamburg LLP

(57) ABSTRACT

A chamfering air tool includes a driving shaft in a casing rotated by air pressure, a rotary shaft perpendicularly combined to the driving shaft for rotation, and a cutter fixed to the rotary shaft. Air holes are formed through the rotary shaft in a longitudinal direction. An air discharge groove is formed in the cutter, and a hole communicated with the air hole is formed in a fixing bolt head. An air path is formed in the fixing bolt head to keep a predetermined gap from the cutter. A guide ring having a diameter approximate to a lower end of the cutter is rotatably mounted to the fixing bolt head. Thus, air is blown to the air hole of the rotary shaft, the air hole formed in the fixing bolt head, the air path formed between the cutter and the guide ring, and the air discharge groove of the cutter, thereby eliminating cut chips and cooling the cutter.

11 Claims, 4 Drawing Sheets

CHAMFERING AIR TOOL

BACKGROUND OF THE INVENTION

1. Field of the Invention

The present invention relates to a chamfering air tool for rounding an edge of a subject with softly moving in surface contact with the edge of the subject, and more particularly to a chamfering air tool in which a rotating cutter having a shape suitable for chamfering is mounted to a rotary shaft having an air hole, a rotational cap having a guide flange for guiding an air tool in surface contact with a subject is installed to a casing, and an air discharge hole is formed to be inclined to discharge air in a direction approximately opposite to a resultant of a force for advancing the air tool and a force for cutting the subject, whereby the guide flange and the rotating cutter shapes a chamfering portion uniformly and stably, the air blown to the air hole discharges out cut chips and dusts and cools down to improve efficiency of work, and the air tool is more closely adhered to the subject and easily advanced by means of the reaction of the air discharged to an air discharge hole, thereby making the chamfering air tool be used more conveniently.

2. Description of the Prior Art

A conventional chamfering air tool is configured so that a driving shaft for rotating by air pressure and a rotary shaft orthogonal to the driving shaft and receiving a driving force from the driving shaft are installed in a casing, and a plurality of bites are attached to an end of the rotary shaft to process an edge of a subject to be processed. In addition, in order to protect the bites and prevent crushed pieces from being scattered, a cap may be attached to the casing around the bites.

As an alternative, one rotating cutter may be installed instead of a plurality of bites. Such a rotating cutter has a plurality of chamfering blades densely protruded at regular intervals with a toothed shape so as to grind a subject to be processed.

In case of such a conventional chamfering air tool, a shape of the cutter is not coincided with the shape to be chamfered, so a worker should handle the air tool according to the shape of the chamfering portion for processing. In this work, it is not easy to apply a uniform force, and the subject is not chamfered regularly, particularly for a round, since an interface between the subject and the chamfering air tool is not regular due to wrong posture of the worker. That is to say, since a worker chamfers an edge of the subject with the use of the cutter by eye measure, a chamfering angle is not regular and much time is taken for the work, inefficiently.

In addition, in the work using the conventional cutter, the subject and the cutter may be heated due to friction between them, so a worker may get burned. Moreover, if the cutter is heated, abrasion resistance of the cutter is deteriorated, so the cutter should be exchanged very frequently. Furthermore, cut chips of the subject that is cut by the cutter are not easily discharged, thereby disturbing the cooling process or the chamfering work.

In addition, a worker should apply a uniform force to the cutter of the chamfering air tool so that the cutter keeps contacting with the subject, and the chamfering work should be conducted with advancing the cutter in a constant direction. However, a worker may not chamfer the subject with keeping a right posture since the air tool itself is heavy, the discharged air disturbs the worker, and the cut chips are often scattered to the face of the worker. That is to say, the air tool generally receives air from a compressor and rotates an air motor and a driving shaft connected the air motor by means of the air pressure, and the cutter is mounted to the rotary shaft perpendicularly mounted to the driving shaft. Thus, after generating a rotational force, the air is discharged out through a hole formed in the casing. However, wrong position and orientation of the hole causes defects in the chamfering work.

Moreover, in the conventional chamfering air tool, since a bolt hole formed for connection of steel structure cannot be filleted well, gap may be generated among a bolt head, a nut and the steel structure. In addition, since paint is not uniformly coated, rain or the like may be introduced into the gap to corrode the inside of the steel structure, thereby causing serious problems in safety.

Such problems are caused in constructing a building structure such as a bridge or a large ship in a shipyard. Such inferiorities are very serious since they may cause may take a terrible toll of lives.

SUMMARY OF THE INVENTION

Therefore, it is an object of the present invention to provide a chamfering air tool in which a cutter has an improved shape to always form chamfering portions with the same shape, a guide flange for guiding an air tool in surface contact with a subject to be processed so that the cutter may chamfer the subject in exact contact, the air giving a driving force to improve abrasion resistance and eliminate cut chips is partially flowed near to the cutter for the purpose of cooling and removal of the cut chips, and an air discharge hole is formed to have its position and orientation be approximate to a direction opposite to a resultant of a direction for advancing the air tool and a direction of force applied so that the air tool may be more closely adhered to the subject and easily advanced by means of reaction of the discharged air, thereby ensuring more convenient use of the chamfering air tool.

BRIEF DESCRIPTION OF THE DRAWINGS

Other objects and aspects of the present invention will become apparent from the following description of embodiments with reference to the accompanying drawing in which.

DETAILED DESCRIPTION OF THE PREFERRED EMBODIMENT

Figure 1:
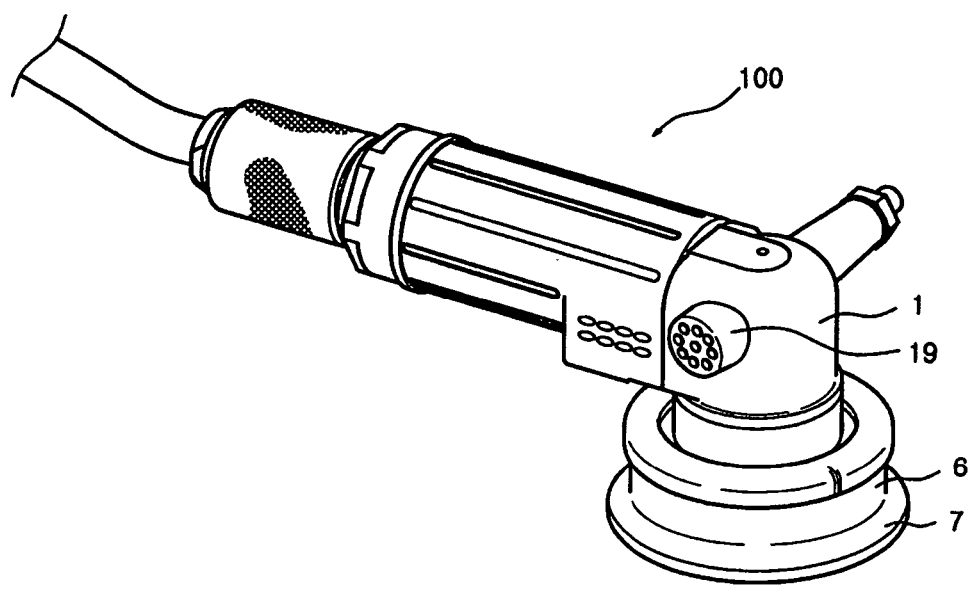
FIG. 1 is a perspective view showing a chamfering air tool according to the present invention.
Figure 2:
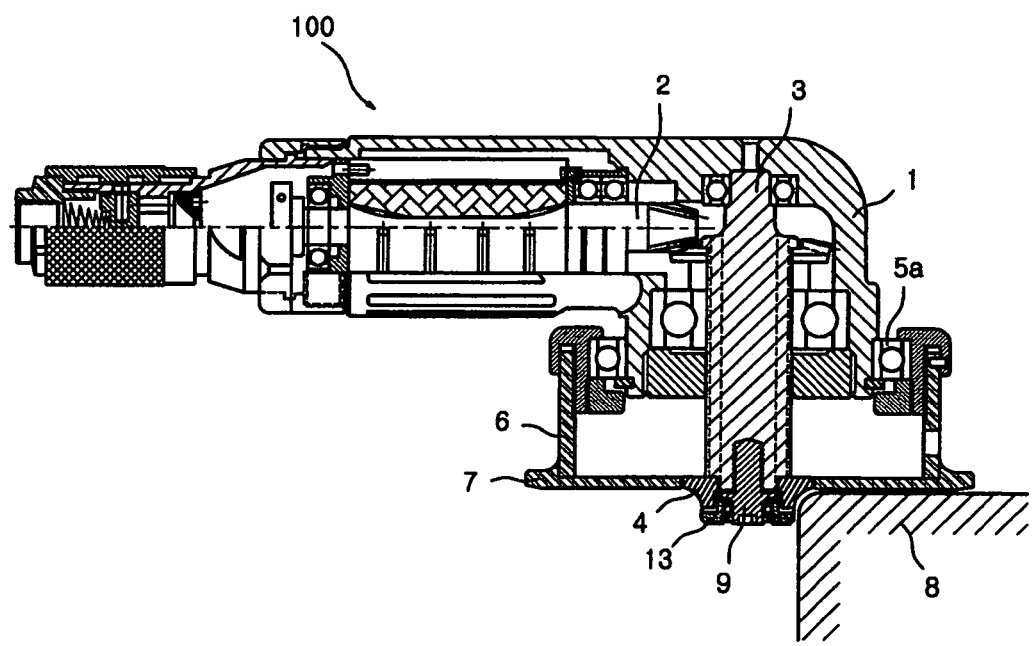
FIG. 2 is a sectional view showing the chamfering air tool according to the present invention.

Hereinafter, the present invention will be described in more detail referring to the drawings.

A chamfering air tool 100 of the present invention includes a driving shaft 2 rotated by means of air pressure in a casing 1, a rotary shaft 3 perpendicularly combined to the driving shaft 2 so as to be rotated, and a cutter 4 fixed to an end of the rotary shaft 3 by means of a fixing bolt 9. A bearing 5a is mounted to the casing 1 on which the rotary shaft 3 is protruded. An upper end of a cylindrical rotational cap 6 having a length corresponding to a protruded length of the rotary shaft 3 is mounted to an outer circumference of the bearing 5a. In addition, a guide flange 7 having a disk shape is mounted to a lower end of the rotational cap 6 so that the guide flange 7 is rotatable by means of the bearing 5a in contact with a subject 8 to be processed. Of course, the guide flange 7 has a ring shape with a hollow center, and the cutter 4 for chamfering is positioned in the center hole.

In addition, the chamfering air tool 100 including the cutter 4 fixed by the fixing bolt 9 to the end of the rotary shaft 3 has a plurality of air holes 10a formed through the rotary shaft 3 in a length direction of the rotary shaft 3. An air discharge groove 11 is formed in the cutter 4, and an air hole 10b communicated with the air hole 10a is formed in a head of the fixing bolt 9. An air path 12 is formed in the head of the fixing bolt 9 to keep a predetermined gap from the cutter 4, and a guide ring 13 having a diameter approximate to that of a lower end of the cutter 4 is rotatably mounted to the head of the fixing bolt 9 by means of a bearing 5b. Thus, air is blown to the air hole 10a of the rotary shaft 3, the air hole 10b formed in the head of the fixing bolt 9, the air path 12 formed between the cutter 4 and the guide ring 13, and the air discharge groove 11 of the cutter 4 in order to eliminate cut chips and cool the cutter 4.

In addition, the cutter 4 has a projection 14 formed in a mount hole 15 to which the head of the fixing bolt 9 is combined. A plurality of chamfering blades 17 having a chamfering circular surface 16 shaped corresponding to a chamfering portion to be formed at an edge of the subject 8 are circularly arranged at regular intervals. The air discharge groove 11 is formed between the adjacent chamfering blades 17 due to their height difference.

Moreover, key grooves 20 are formed in one side of the mount hole 15 of the cutter 4 and the corresponding rotary shaft 3, and the cutter 4 is firmly fixed to the rotary shaft 3 by means of a key 21.

Next, a plurality of air discharge holes 18 are formed in the casing 1 in a direction approximately opposite to a resultant of a direction for advancing the air tool 100 and a direction for pressing the subject 8 so that the air tool 100 is more closely adhered to the subject 8 and advanced more easily by means of reaction of the discharged air. In particular, the air discharge holes 18 may be formed in a discharge protrusion 19 protruded a predetermined height from the casing 1 so that the discharged air is more straightly flowed and the reaction is also more straightly applied, thus ensuring more effective action.

In the present invention as mentioned above, the guide flange 7 mounted to the rotational cap 6 rotatably combined to the chamfering air tool 100 by means of the bearing 5a comes in contact with an upper surface of the subject 8 to be chamfered, and the chamfering circular surface 16 formed on the chamfering blade 17 of the cutter 4 protruded through the center hole of the guide flange 7 comes in contact with an edge of the subject 8. And then, the edge of the subject 8 is processed with the cutter 4 being rotated.

The edge of the subject 8 is simply chamfered into a rounded shape identical to the shape of the chamfering circular surface 16 formed on the toothed chamfering blade 17 of the cutter 4. Subsequently, if the cutter 4 is pushed laterally with closely surface-contacting with the edge of the subject 8, the cutter 4 is moved with a horizontal surface of the subject 8 being contacted with the guide flange 7, and with a vertical surface being contacted with the guide ring 13 mounted to the bearing 5b below the cutter 4.

The guide flange 7 smoothly guides the air tool 100 by means of rotation of the rotational cap 6 rotated by means of the bearing 5a, and the guide ring 13 is smoothly rotated by means of rotation of the bearing 5b to move the air tool 100 to a side, thereby chamfering the edge of the subject 8 regularly.

Here, special structure is provided so that the guide flange 7 may be easily surface-contacted with the upper surface of the subject 8, and so that the guide flange 7 is not separated from the upper surface of the subject 8 when the subject 8 is chamfered with close adhesion. The direction of the air discharge holes 18 formed in the casing 1 makes such action.

That is to say, since a perforation direction (x) of the air discharge holes 18 is formed approximately opposite to a resultant of a direction (z) for advancing the air tool 100 and a direction (y) for giving a cutting force to the subject 8, reaction of the air discharged through the air discharge holes 18 makes the air tool 100 more adhered to the subject 8 and allows the air tool 100 to be moved in its advancing direction (z) with less power.

Figure 3:
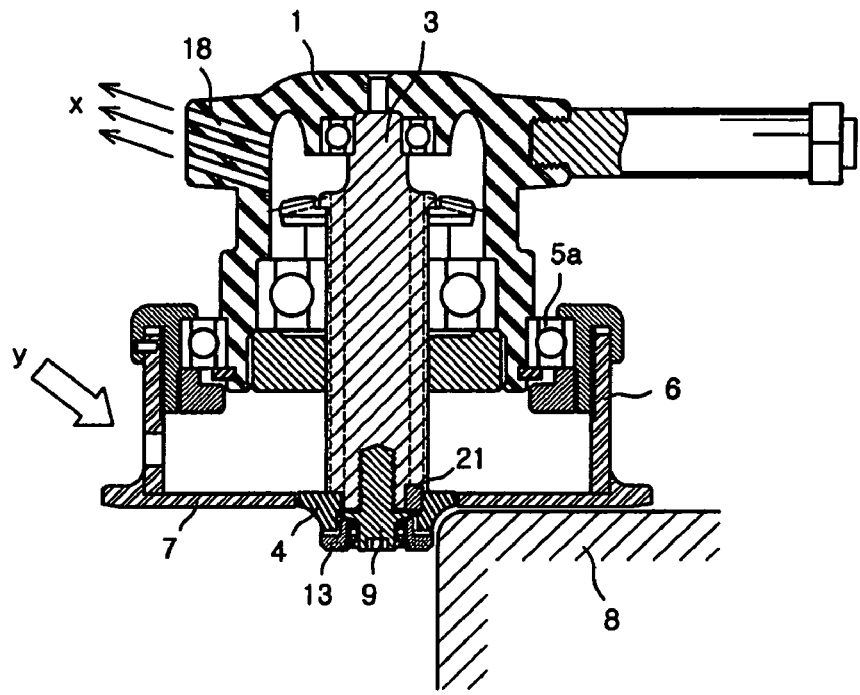
FIG. 3 is a sectional view showing an essential part of the chamfering air tool according to the present invention.
Figure 4:
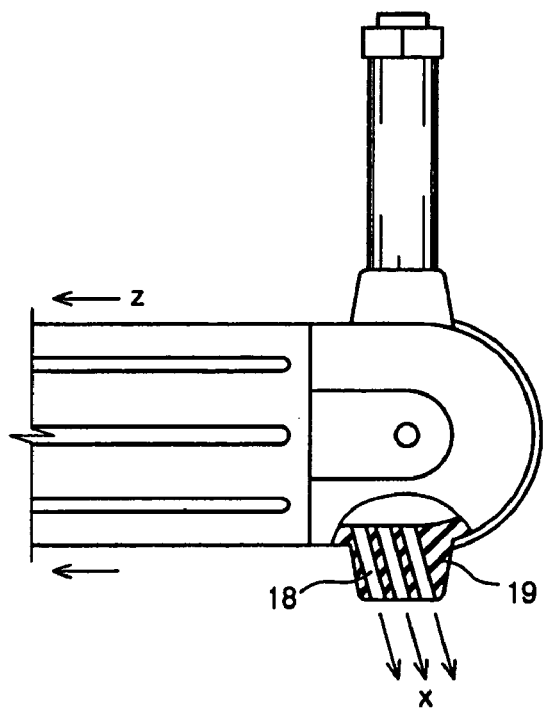
FIG. 4 is a plane view showing an essential part of the chamfering air tool according to the present invention.

As described above, since the air discharge holes 18 are inclined a predetermined angle against a horizontal surface in the air tool of the present invention as shown in FIG. 3, the fast and high pressure air discharged to a direction (x) of the casing 1 through the air discharge holes 18 after rotating an air motor in the casing 1 is oriented from a horizontal direction to a direction inclined upward a predetermined angle, when the subject 8 is processed using the air tool 100. At this time, the force caused by reaction of the air discharged upwardly fast to a side of the casing 1 presses a front end of the air tool 100 downwardly to an opposite portion of the air discharge holes 18, so the cutter 4, the guide flange 7 and the guide ring 13 mounted in the air tool 100 become respectively closely surfaced with a portion to be processed and the upper surface of the subject 8.

Accordingly, the power required for a worker to press the air tool 100 in a direction (y) toward the subject 8 so that the cutter 4 is contacted with the portion to be processed for precise and regular work is significantly compensated.

Furthermore, the air discharge holes 18 are preferably formed in the discharge protrusion 19 protruded on one side of the casing 1 because of the following fact. A discharge path of the air discharge hole 18 is elongated as much as a protruded length of the discharge protrusion 19, and the discharged air is accordingly flowed more straightly, so the power caused by the reaction of the discharged air is also increased. As a result, the cutter 4 becomes more closely adhered to the processing portion of the subject 8.

In addition, since the cutter 4 is rapidly rotted with receiving power, the cutter 4 receives a rotational force during its operation, and the fixing bolt 9 that fixes the cutter 4 is accordingly supplied with a great amount of rotational force. Thus, in the conventional case, such rotational force combined the fixing bolt 9 more firmly, so a great amount of power was required for releasing the fixing bolt 9 in order to exchange the cutter 4.

However, the present invention provides the key 21 and the key groove 20 in order to solve the conventional problem. That is to say, the key groove 20 is formed in the mount holes 15 of the rotary shaft 3 and the cutter 4, and the key 21 is inserted after the cutter 4 is combined with the rotary shaft 3 in order to fix the cutter 4 and the rotary shaft 3. Thus, though the cutter 4 is rotated fast, the key 21 and the key groove 20 fix the cutter 4 and the fixing bolt 9 so that they are not combined further. Accordingly, it is easier to rotate and release the fixing bolt 9 for exchange of the cutter 4.

Figure 5:
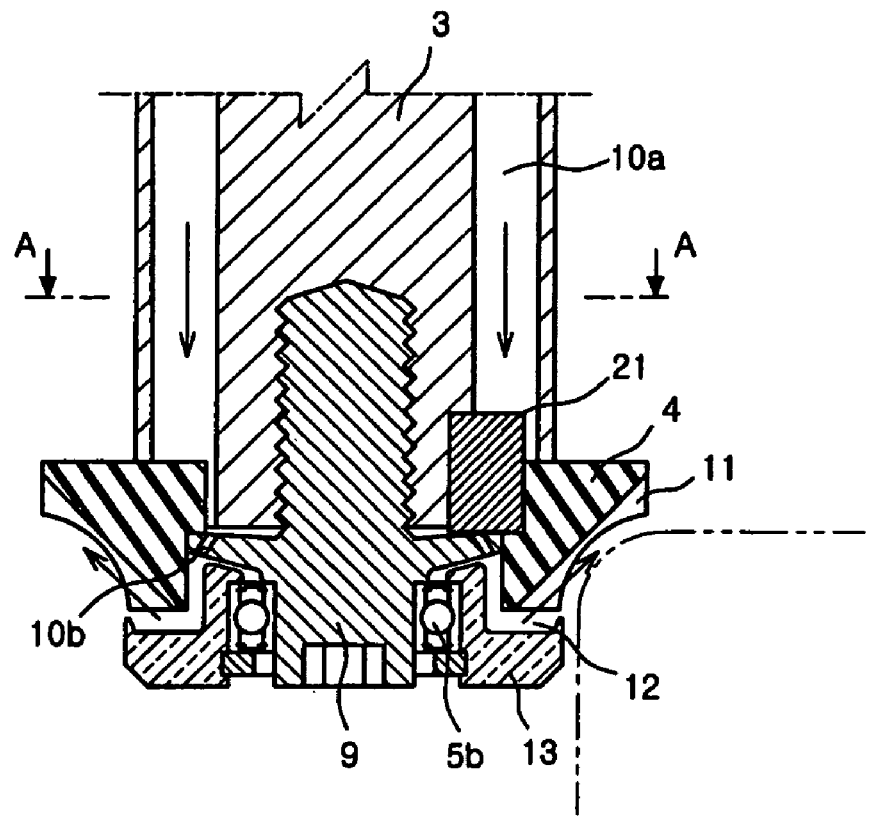
FIG. 5 is a sectional view showing a cutter mounted to the chamfering air tool according to the present invention.
Figure 6:
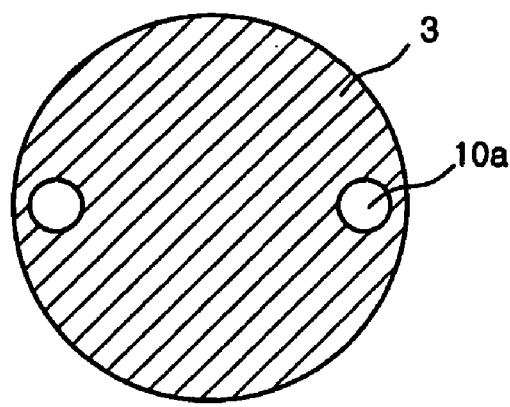
FIG. 6 is a sectional view taken along A—A line of FIG. 5.

In addition, the present invention improves efficiency of work by cooling the cutter 4 and discharging cut chips with the use of air. As shown in FIG. 5, a plurality of air holes 10a are formed in the rotary shaft 3, a plurality of air discharge grooves 11 are formed in the cutter 4, and the air path 12 is formed between the guide rings 13 mounted below the cutter 4. Thus, if the rotary shaft 3 is rotated by means of the driving shaft 2 operated by air, the supplied air is partially introduced into the air holes 10a formed through the rotary shaft 3 and then introduced into the air path 12 through the air holes 10b formed through the head of the fixing bolt 9. At this time, the compressed air introduced into the air path 12 is collided with the guide ring 13 and then reflected upward, and at the same time the compressed air is injected into the air discharge groove 11 of the cutter 4 and then flowed out. Thus, the cutter 4 is cooled by the compressed air together with the surface-contacted subject 8, thereby preventing the chamfering air tool 100 and the subject 8 from being overheated. In addition, the cut chips generated by cutting of the cutter 4 are blown by the injected compressed air and then eliminated, so the cut surface may be seen well and the cutting work is not disturbed. Here, the air discharge groove 11 formed in the cutter 4 is formed by a stepped corn of the toothed chamfering blade 17, and the number of the air holes 10a formed through the rotary shaft 3 and the number of the air holes 10b formed through the fixing bolt 9 are selected depending on the size of the air tool 100.

Figure 7:
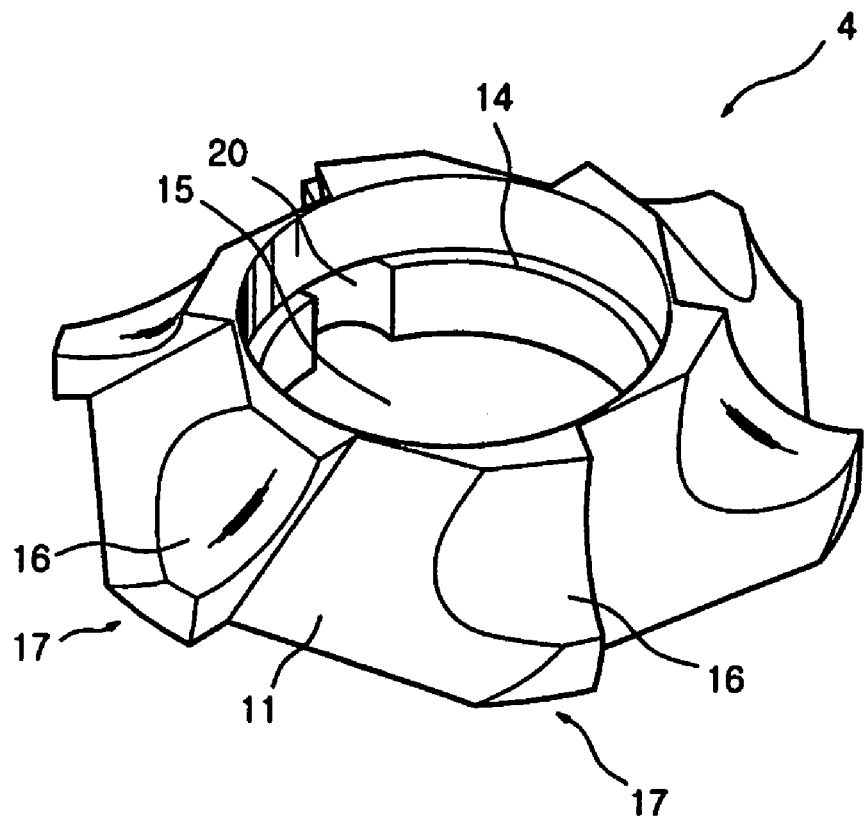
FIG. 7 is a perspective view showing the cutter employed in the chamfering air tool according to the present invention.
Figure 8:
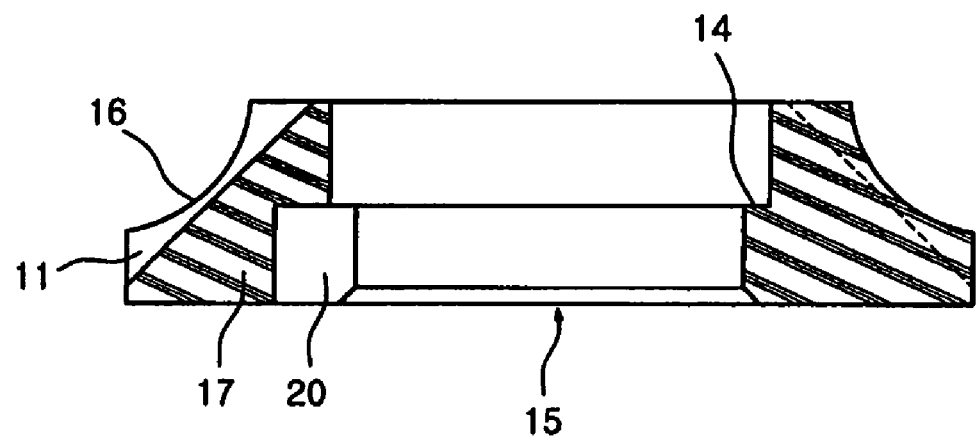
FIG. 8 is a sectional view showing the cutter of FIG. 7.

Moreover, the cutter 4 of the present invention has structural features as shown in FIGS. 7 and 8. That is to say, the chamfering circular surface 16 for rounding an edge of the subject 8 is formed on each chamfering blade 17, and a step is formed in interface of the chamfering blades 17 due to their height difference to form the air discharge groove 11, so the edge may be exactly processed.

That is to say, though the edge shape is conventionally determined by means of eye measurement and manipulating angle of the air tool 100, the present invention allows exact and regular edge processing owing to the chamfering circular surface 16 formed on the cutter 4 and since posture of the air tool 100 is stabilized owing to the guide flange 7 and the guide ring 13.

Due to the structural features of the cutter 4, the chamfering air tool 100 of the present invention enables to chamfer an edge of the subject and particularly fillet a bolt hole formed for connection of steel structures in its own way. In case of a steel building or a large structure such as bridge and ship, a holt hole is perforated and a bolt is combined thereto in the prior art. At this time, gaps are generated among the bolt head, the nut and the steel structure, and paint is not regularly coated. Thus, inside of the steel structure is corroded due to introduction of rain or the like, thereby causing very serious problems in safety. However, if the cutter 4 is inserted into the bolt hole and then rotated as in the present invention, the chamfering blade 17 of the cutter 4 may very easily fillet an edge of the bolt hole. Thus, the bolt head and the nut may be desirably surface-contacted with the subject 8, so the conventional problems are solved.

As described above, in the present invention, the air tool 100 may be smoothly and accurately transferred owing to the rotational cap 6 and the guide ring 13 that are freely rotatable, and an edge of a desired shape may be processed according to the shape of the cutter 4. In addition, the cutter 4 is air-cooled by means of the air circulation passage such as the air hole 10a formed in the rotary shaft 3, thereby extending durability life, improving work efficiency and easily discharging cut chips. In addition, since the air discharge hole 18 may be oriented to a desired direction, the chamfering work may be conducted with very small power.

What is claimed is:

1. A chamfering air tool comprising a casing, a driving shaft in the casing rotated by means of air pressure, a rotary shaft perpendicularly combined to the driving shaft so as to be rotated, and a cutter fixed to an end of the rotary shaft by means of a fixing bolt, a bearing mounted to the casing from which the rotary shaft protrudes, an upper end of a cylindrical rotational cap mounted to an outer circumference of the bearing, and a guide flange is mounted to a lower end of the rotational cap so that the guide flange is rotatable by means of the bearing while in contact with a subject to be processed.

2. The chamfering air tool according to claim 1, wherein said bearing mounted on the casing is a first bearing, a second bearing mounted to a head of the fixing bolt, and a guide ring having a diameter approximate to that of a lower end of the cutter mounted to an outer circumference of the second bearing so that the guide ring guides the air tool (100) with an outer circumference thereof being rolled in contact with the subject being processed.

3. The chamfering air tool according to claim 1,
wherein the cutter has a projection, formed in a mount hole, to which the head of the fixing bolt is combined, a plurality of chamfering blades having a chamfering circular surface shaped corresponding to a chamfering portion to be formed at an edge of the subject are circularly arranged at regular intervals, and an air discharge groove is formed between the adjacent chamfering blades due to their height difference.

4. The chamfering air tool according to claim 1,
wherein a plurality of air discharge holes are formed in the casing in a direction approximate to a resultant of a direction for advancing the air tool and a direction for giving a cutting force to the subject so that the air tool is more closely adhered to the subject and advanced by means of reaction of the discharged air.

5. The chamfering air tool according to claim 4,
wherein the air discharge holes are formed in a discharge protrusion protruded a predetermined height from the casing so that the discharged air is more straightly flowed and the reaction is also more straightly applied.

6. The chamfering air tool according to claim 1,
wherein key grooves are formed in the rotary shaft and the cutter, and a key is inserted into the key grooves so as to fix the cutter firmly.

7. A chamfering air tool comprising a casing, a driving shaft in the casing rotated by means of air pressure, a rotary shaft perpendicularly combined to the driving shaft so as to be rotated, and a cutter fixed to an end of the rotary shaft by means of a fixing bolt, a plurality of air holes formed through the rotary shaft in a longitudinal direction of the rotary shaft, an air discharge groove formed in the cutter, an air hole formed in the head of the fixing bolt and communicated with the air holes of the rotary shaft to keep a predetermined gap from the cutter, and a guide ring having a diameter approximate to that of a lower end of the cutter rotatably mounted to the head of the fixing bolt by means of a bearing so that air is blown to the air holes of the rotary shaft, the air hole formed in the head of the fixing bolt, the air path formed between the cutter and the guide ring, and the air discharge groove of the cutter in order to eliminate cut chips and cool the cutter.

8. The chamfering air tool according to claim 7, wherein the cutter has a projection, formed in a mount hole, to which the head of the fixing bolt is combined, a plurality of chamfering blades having a chamfering circular surface shaped corresponding to a chamfering portion to be formed at an edge of a subject to be processed are circularly arranged at regular intervals, and the air discharge groove is formed between the adjacent chamfering blades due to their height difference.

9. The chamfering air tool according to claim 7, wherein a plurality of air discharge holes are formed in the casing in a direction approximate to a resultant of a direction for advancing the air tool and a direction for giving a cutting force to a subject being processed so that the air is more closely adhered to the subject and advanced by means of reaction of the discharged air.

10. The chamfering air tool according to claim 9, wherein the air discharge holes are formed in a discharge protrusion protruded a predetermined height from the casing so that the discharged air is more straightly flowed and the reaction is also more straightly applied.

11. The chamfering air tool according to claim 7, wherein key grooves are formed in the rotary shaft and the cutter, and a key is inserted into the key grooves so as to fix the cutter firmly.

* * * * *